United States Patent
Brannstrom et al.

(10) Patent No.: US 9,730,526 B2
(45) Date of Patent: Aug. 15, 2017

(54) CHILD TRANSPORT DEVICE

(71) Applicant: VOLVO CAR CORPORATION, Gothenburg (SE)

(72) Inventors: Mattias Erik Brannstrom, Gothenburg (SE); Lotta Jakobsson, Torslanda (SE)

(73) Assignee: VOLVO CAR CORPORATION (SE)

( * ) Notice: Subject to any disclaimer, the term of this patent is extended or adjusted under 35 U.S.C. 154(b) by 125 days.

(21) Appl. No.: 14/714,689

(22) Filed: May 18, 2015

(65) Prior Publication Data
US 2015/0343922 A1 Dec. 3, 2015

(30) Foreign Application Priority Data
May 27, 2014 (EP) .................................... 14169987

(51) Int. Cl.
*B60N 2/28* (2006.01)
*A47D 13/02* (2006.01)
(Continued)

(52) U.S. Cl.
CPC .............. *A47D 1/10* (2013.01); *A47D 13/02* (2013.01); *B60N 2/26* (2013.01); *B60N 2/2806* (2013.01);
(Continued)

(58) Field of Classification Search
CPC ........ A47D 13/025; A47D 13/02; A47D 1/10; A47D 1/103; B60N 2/28; B60N 2/2842; B60R 22/105; B60R 22/14
(Continued)

(56) References Cited

U.S. PATENT DOCUMENTS

| 2,550,851 A * | 5/1951 | Nichols ................ A47D 13/025 224/159 |
| 3,027,058 A * | 3/1962 | Huber .................. A47D 13/025 224/155 |

(Continued)

FOREIGN PATENT DOCUMENTS

| AU | 2010246523 A1 | 6/2011 |
| DE | 19732385 A1 | 1/1999 |

(Continued)

OTHER PUBLICATIONS

Peter Claeson, "A Concept for Optimization of Rearward Facing Child Restraint System with ISOFIX", ISO/22/12/WG 1 N570, Oct. 14, 2001, 3 Pages.

(Continued)

*Primary Examiner* — Adam Waggenspack
(74) *Attorney, Agent, or Firm* — Brooks Kushman P.C.

(57) ABSTRACT

The present disclosure relates to a child transport device for a child. The child transport device is transformable between a vehicle configuration adapted for attachment in a vehicle, and a carrying configuration adapted for carrying the child against a body of a person. The child transport device comprises a main body, which comprises a safety harness adapted to attach the child to the main body. In the vehicle configuration, a front portion of the main body is adapted to be supported by a first support element, and a rear portion of the main body is adapted to be supported by a second support element, the main body being adapted to be tensioned, such that it when tensioned bridges a distance between the first and second support elements. The disclosure further relates to a method of attaching the child transport device to a vehicle.

21 Claims, 8 Drawing Sheets

(51) Int. Cl.
*A47D 1/10* (2006.01)
*B60N 2/26* (2006.01)

(52) U.S. Cl.
CPC ......... *B60N 2/2842* (2013.01); *B60N 2/2863* (2013.01); *B60N 2002/2815* (2013.01)

(58) Field of Classification Search
USPC ....... 224/158–160, 275, 484, 486, 577, 153, 224/155, 156, 584, 585
See application file for complete search history.

(56) References Cited

U.S. PATENT DOCUMENTS

| | | | | |
|---|---|---|---|---|
| 3,054,637 | A * | 9/1962 | Pambello | A47D 11/005 224/155 |
| 4,009,808 | A * | 3/1977 | Sharp | A47D 13/025 224/160 |
| 4,568,125 | A | 2/1986 | Sckolnik | |
| 4,666,207 | A | 5/1987 | Quartano | |
| 6,065,655 | A * | 5/2000 | Parewick | A47D 13/025 224/158 |
| 6,139,099 | A * | 10/2000 | Skold | B60N 2/28 297/216.11 |
| 7,530,635 | B2 * | 5/2009 | Schramek-Flye | A47D 1/103 297/17 |
| 8,550,316 | B2 * | 10/2013 | Coote | A47D 13/025 224/159 |
| 2006/0130220 | A1 * | 6/2006 | Morgan | A41B 13/00 2/456 |
| 2009/0206116 | A1 * | 8/2009 | Grant | A45F 3/08 224/160 |
| 2009/0230741 | A1 * | 9/2009 | Aaron | B60N 2/2833 297/250.1 |
| 2010/0200625 | A1 * | 8/2010 | Gaum | A47D 13/02 224/158 |
| 2014/0101859 | A1 | 4/2014 | Testa et al. | |

FOREIGN PATENT DOCUMENTS

| | | |
|---|---|---|
| EP | 2546096 B1 | 9/2013 |
| WO | 2011071441 A1 | 6/2011 |

OTHER PUBLICATIONS

Extended European Search Report Dated Mar. 9, 2014, Application No. 14169987.6-1653, Applicant Volvo Car Corporation, 6 Pages.
Extended European Search Report Dated Mar. 24, 2017, Application No. 14 169 987.6-1658, Applicant Volvo Corporation, 6 Pages.

* cited by examiner

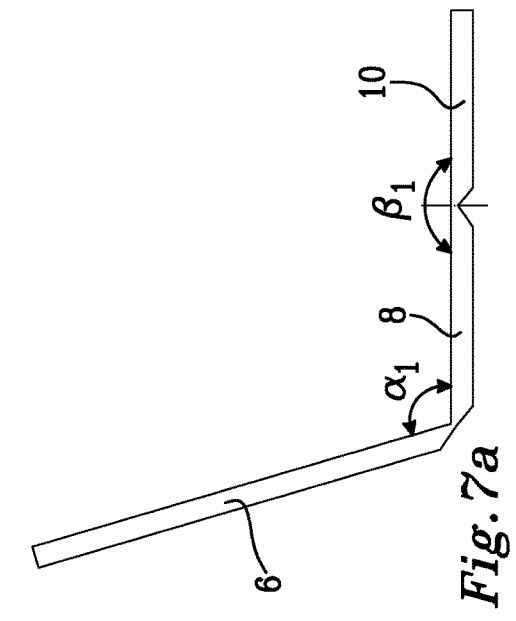
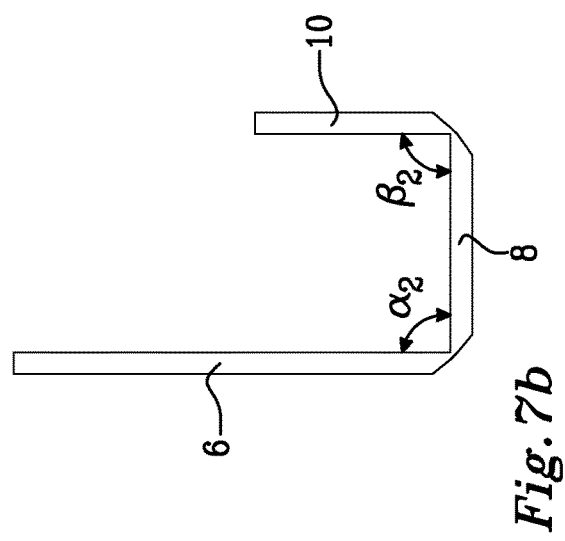
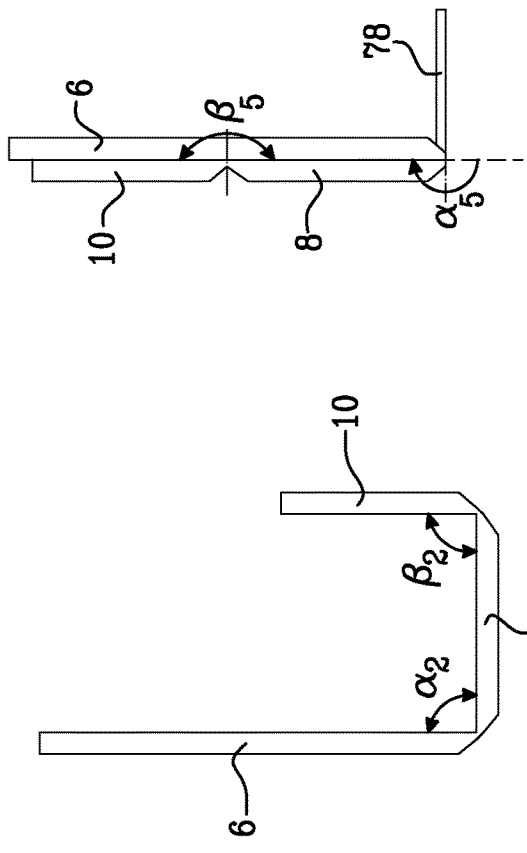
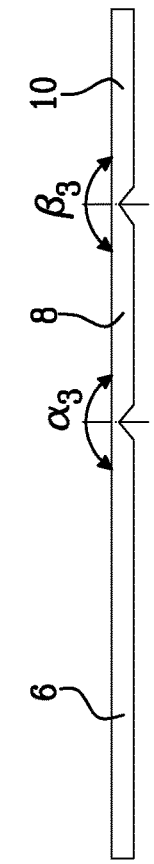
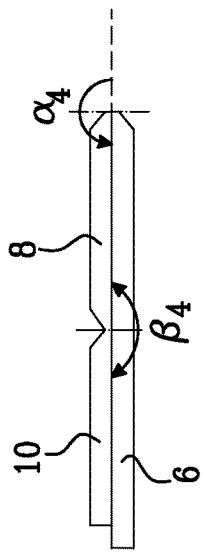
Fig. 7a
Fig. 7b
Fig. 7c
Fig. 7d
Fig. 7e

CHILD TRANSPORT DEVICE

CROSS-REFERENCE TO RELATED APPLICATIONS

This application claims foreign priority benefits under 35 U.S.C. §119(a)-(d) to European patent application number EP 14169987.6, filed May 27, 2014, which is incorporated by reference in its entirety.

TECHNICAL FIELD

The present disclosure relates to a child transport device for a child. The child transport device is transformable between a vehicle configuration and a carrying configuration. The disclosure further relates to a method of attaching the child transport device to a vehicle.

BACKGROUND

Child seats for use in a vehicle are known as such. The child seats are used to increase the safety for children when traveling in a vehicle, e.g., in case of a collision. It is further known that in many situations a child, especially a small child, travels more safely in a child seat facing rearwards than forwards, since a rearward-facing child seat provides more support for the child's head in the event of a sudden deceleration. Such rearward-facing child seats may be placed on the front passenger seat and/or the rear seat.

A conventional child seat for a vehicle may comprise a shell of a rigid material such as plastic, which shell is intended to protect the child in case of a collision. The shell is commonly at least partly covered by a cover of a softer material to provide comfort for the child. However such child seats have some drawbacks. Due to the weight of the shell, such a child seat has a considerable weight and may therefore be difficult to handle, especially when installing the child seat in a vehicle or removing it from the vehicle. Further, when not in use, it may be desirable to store the child seat somewhere else and it will then, due to its construction, occupy a rather large space for example in a luggage boot of the vehicle. Outside the vehicle, the child may be carried in the child seat. The carrying person will then probably hold the child seat with one of the hands, such that there is no face-to-face contact or body-to-body contact with the carrying person.

It is also known to carry a child in a baby carrier, which enables the child to be carried in various positions with respect to the carrying person.

Document WO 2011071441 A1 relates to an ergonomic and safe baby carrier device with a baby sitter function and a positioning function for ergonomic breast feeding. An example shows how the baby carrier can be used as an emergency baby seat when travelling by car when there are no child seats available, even if it is noted that a conventional child seat gives a much better protection.

SUMMARY

An object of the present disclosure is to overcome or ameliorate at least one of the disadvantages of the prior art, or to provide a useful alternative.

It is desirable to provide a child transport device, which may be used both as a baby carrier and a child seat for a vehicle.

It is also desirable to provide a child transport device, which may be positioned in a vehicle such that the child faces rearwards.

It is further desirable that the child transport device is easy to handle, especially when installing it in a vehicle or removing it from the vehicle.

It is in addition desirable that the child transport device has a low weight, facilitating easy handling, since the adjustment and movement of heavy objects in general in a passenger car is extremely awkward. Yet, at the same time it is desirable that the child transport device provides adequate safety for a child using the child transport device.

Thus, in a first aspect of the present disclosure there is provided a child transport device for a child. The child transport device is transformable between a vehicle configuration adapted for attachment in a vehicle, and a carrying configuration adapted for carrying the child against a body of a person. The child transport device comprises a main body, which comprises a safety harness adapted to attach the child to the main body. In the vehicle configuration, a front portion of the main body is adapted to be supported by a first support element, and a rear portion is adapted to be supported by a second support element. The main body is adapted to be tensioned, such that the main body when tensioned bridges a distance between the first and second support elements.

The child transport device is intended for children, e.g., for an infant typically having an age from 0 to 12 months, but it may also be utilized for a toddle, typically having an age from 1 to 3 years.

In the vehicle configuration, the child transport device is used as a rearward-facing child seat for a vehicle. In the carrying configuration, the child transport device is used as a baby carrier. The child is then carried with body-to-body contact to the carrying person. The child transport device is easily transformable between these two configurations. In the carrying configuration, the child may face either forwards or rearwards. The child may be carried on the stomach/chest or on the back of the carrying person, e.g., in a way corresponding to carrying a backpack or rucksack.

The safety harness is of a kind known to the skilled person for attaching a child to a conventional child seat for a vehicle. The safety harness may be a 3-point-harness, a 4-point-harness or a 5-point-harness. The 5-point-harness comprises a lap portion, two shoulder belts and a belt between the legs of the child. The safety harness is utilized to attach the child to the child transport device at least in the vehicle configuration, but preferably also in the carrying configuration. The safety harness should desirably go over a hip of the child and desirably also over at least one of the shoulders. Further, it is preferred to arrange the buckle or buckles of the safety harness, such that the buckle is not jammed between the child and the carrying person in an uncomfortable way in the carrying configuration.

The first support element may comprise, be comprised in or be constituted by a back rest of a vehicle seat, a headrest of a vehicle seat or a dashboard. The first support element supports at least a part of the front portion of the main body, e.g., a portion of the main body corresponding to a back and/or a neck of the child when located in the child transport device.

The second support element may comprise, be comprised in, or be constituted by a cushion of a vehicle seat or a lap of a person sitting in a vehicle seat. The second support element is intended to support at least a part of the rear portion of the main body, e.g., a portion of the main body corresponding to a bottom and/or legs of the child when located in the child transport device in the vehicle configuration. Purely as an example, the cushion of the vehicle seat may support a part of the rear portion corresponding to the bottom of the child, and the lap of the person sitting in the vehicle seat may support a part of the rear portion corresponding to the legs of the child, depending on which object is utilized as the second support element.

The main body is adapted to be tensioned, such that it can bridge the distance between the first and second support elements, e.g., the distance between the rear seat and the backrest of a front seat. The main body may be tensioned by means of belts or straps, which are comprised in the child transport device, e.g., along at least a portion of the lateral sides of the main body. The safety harness for the child may be connected to these belts or straps. The main body is adapted to support the child. It may be made of a relatively soft material, which is able to be formed according to the body of the child. Purely as an example, the child transport device may function in a way corresponding to a hammock. The hammock comprises a cloth panel tensioned by ropes, which are to be suspended between two points, e.g., trees. The straps or belts used for tensioning of the child transport device would correspond to the ropes of the hammock. The main body of the child transport device would correspond to the cloth panel of the hammock.

The child transport device may comprise a first attachment member connected or connectable to the main body for attachment in a forward direction of the vehicle, and/or a second attachment member connected or connectable to the main body for attachment in a rearward direction of the vehicle.

The first attachment member and/or the second attachment member may be utilized for tensioning the main body, e.g., by being connectable to the above-mentioned belts or straps for tensioning the main body, such that the main body when tensioned bridges the distance between the first and second support elements. The above-mentioned belt or strap for tensioning the main body may constitute a portion of the first attachment member and/or the second attachment member.

The first attachment member is attachable to the vehicle in front of the child transport device. The first attachment member may be attached to a dedicated first attachment at a floor or a body portion of the vehicle or it may be attached to the front seat, e.g., at a rail of the front seat, or at a dashboard, e.g., at a dedicated attachment on the dashboard. The first attachment member may be utilized to provide a main force retention in a possible rear-end collision of the vehicle or during the rebound phase of a frontal collision. Preferably the first attachment member has an adjustable length.

The second attachment member is attachable to a second attachment point being located in the vehicle rearward of the child transport device, e.g., a seat belt, a seat belt anchor or an ISOFIX anchor at a vehicle seat. The second attachment member provides a main force retention in a possible frontal collision of the vehicle. Preferably the second attachment member has an adjustable length.

The concept of utilizing a child seat together with an ISOFIX anchor is described in the document Claeson P, A Concept for Optimization of Rearward Facing Child Restraint System with ISOFIX. ISO/TC22/SC12/WG1 Child Restraint Systems (in road vehicles), Document Number N570, October 2001.

The first attachment member and/or the second attachment member may be connected, e.g., sewn, glued and/or welded, or connectable, e.g., by means of a hook-and-eye fastener, to the above-mentioned belts or straps for tensioning the main body and/or to the main body of the child transport device.

The first and/or second attachment members are preferably connected to the main body at a height which is above the center of gravity of the child when seated in the child transport device in the vehicle configuration. The first and/or second attachment member may be connected or connectable at a height corresponding to a torso of the child seated in the child transport device. There will be a force transfer path between the vehicle via the first attachment member and/or the second attachment member and the child transport device, e.g., to the belts or straps for tensioning the main body. There is also a force transfer path between the vehicle and the safety harness of the child, e.g., via the belts or straps for tensioning the main body.

The first attachment member and/or the second attachment member may comprise a belt or a strap, or a pair of belts or straps. A belt or a strap is able to take up longitudinal pulling forces. It is not adapted to take compressive loads. However, by using both first and second attachment members the child transport device can take up forces impacting both from the front and the rear of the vehicle.

The pair of straps of the first attachment member may be two separate straps, or one long strap may be attached to a back side of the main body, pass along the back side and form both straps of the pair. Similarly, the pair of straps of the second attachment member may be two separate straps, or one long strap may be attached to the back side of the main body and form both straps of the pair. As another alternative, one single long strap may form one strap of the pair of the first attachment member and one strap of the pair of the second attachment member.

As an option, the child transport device may comprise an additional second attachment member, e.g., connecting a lower part of the front portion to the vehicle rearward of the child transport device, e.g., to the second attachment point.

As another option, the child transport device may comprise an additional first attachment member connecting the front portion to the vehicle in front of the child transport device, e.g., connecting the main body to another location in the vehicle than the first attachment member. The first attachment member and the additional first attachment member may be connected the same or different locations in the main body, e.g., at different heights in the vehicle configuration.

The first attachment member and/or the second attachment member may be utilized to fasten the child transport device to the carrying person in the carrying configuration, e.g., at chest height and/or around the nape of the neck. The additional first or second attachment member, if any, may be also utilized to fasten the child transport device to the carrying person, e.g., at waist height. Elongate pads may be used to distribute the pressure from the attachment members on the carrying person. It would also be possible, to use a carrying arrangement for fastening the child transport device to the carrying person, e.g., having wider and/or wadded belts, such as a waist-belt or shoulder belts corresponding to the belts used in a backpack or rucksack.

The child transport device may comprise a headrest attachment member, adapted to attach the child transport device to a headrest of a vehicle seat located in front of the child transport device. The headrest attachment member may be adapted to encircle the headrest or height adjustment members comprised in the headrest. The headrest attachment member may comprise two parts which are adapted to encircle the headrest or the height adjustment members of the headrest and be fastened to each other, e.g., by buttons, a buckle, snap fit members, a hook-and-loop member or by tying the parts together.

The first attachment member and/or the second attachment member and/or the optional headrest attachment member may be separable from the rest of the child transport device, such that they may be left in the vehicle, when the child is carried in the carrying configuration. In that case they may be attachable to the main body by means of snap-fit members.

The child transport device may also comprise one or more straps, which may be used for attachment to the vehicle and/or for shaping the child transport device. These straps may be connected or connectable to the belts or straps for tensioning the main body, or forming a portion of the belts or straps for tensioning the main body. The one or more straps may be attached to an attachment point in the vehicle being located at the vehicle seat rearward of the child transport device, e.g., the seat belt of the vehicle seat, the seat belt anchor or the ISOFIX anchor. This attachment point may be the same as for the second attachment member.

The child transport device and/or the dashboard may comprise a dashboard connection adapted to attach the child transport device to the dashboard.

The main portion may comprise a first portion, a second portion and an optional third portion. The first portion is adapted to receive a back of the child. The second portion is adapted to receive a bottom of the child. The third portion is adapted to support legs of the child from below in the vehicle configuration and, optionally, to at least partly surround a belly of the child in the carrying configuration. The third portion is adjacent to the second portion at the opposite side of the main body in relation to the first portion. The first portion may comprise a part adapted to receive and support a head of the child. The main body has a longitudinal direction following the surface of the main body in a length direction, such that the first, second and third portions follow after each other. There may be physical delimitations between the portions, such as hinge members, which may be in the form of compressions of the main body. The portions may form separate units, which are connectable to each other, e.g., by a zipper, buttons or a snap fit member. One or more of the portions, e.g., all three portions, may form an integral unit. In many embodiments there are no physical delimitations between the portions of the main body, instead the delimitations relate to their functions of the different portions when supporting the child. It would also be possible to have a main body comprising two or three separate parts connectable by hinge members, e.g., with snap-fit functions, wherein a part comprises one or two of the above-mentioned portions. In that case, different materials may be chosen for the different parts.

The first portion may correspond to the above-mentioned front portion of the main body. The second portion and/or the third portion may correspond to the above-mentioned rear portion of the main body.

The first and the second portions may assume an angle $\alpha$ in relation to each other. If the first and/or second portion is curved, the angle may be defined using an average plane of the portion. In the vehicle configuration the angle $\alpha$ may be in the range of $90°<\alpha<145°$, preferably $100°<\alpha<135°$, more preferably $110°<\alpha<125°$. In the carrying configuration the angle $\alpha$ may be in the range of $80°<\alpha<100°$.

The child transport device may comprise at least one side flap connected or connectable at least along a portion of a first or a second lateral side of the main body. The at least one side flap may be made of a flexible material such as fabric. The material of the side flap may be more flexible, e.g., easier to fold or roll, than that of the main body. The side flap may be arranged to have a use position, wherein the at least one side flap is adapted to be located along a side of the child and a storage position, wherein the at least one side flap is rolled or folded to a back side of the main body. The side flap may be utilized to protect the child at side impacts.

The side flap is connected to the main body, e.g., by being sewn, glued or welded to the main body. As an alternative, or a complement, a unitary piece of fabric may form both a part of the main body and one or more of the side flaps. As yet an alternative, the side flap may be a separate element, which is connectable to the main body, e.g., by a zipper, buttons or a snap-fit member.

The child transport device may comprise at least two side flaps, a first side flap connected or connectable at least along a portion of the lateral side of the main body and a second side flap connected or connectable at least along another portion of the lateral side of the main body, the first side flap and the second side flap being attachable to each other distant from the connection to the main body, e.g., by means fastening members, such as buttons, snap fit members, hook-and-loop members or by tying the side flaps together. The first and the second side flap are then located at the same lateral side of the main body. When attached to each other, the at least two side flaps may form a side wall of the child transport device. Preferably, there are side flaps at both lateral sides of the main body, such that a side wall may be formed at each lateral side.

When in the carrying configuration or during storage of the child transport device, one or more of the side flaps can be folded to a back side of the main body and attached to the back side or pairwise to each other. As an alternative, the side flaps may be utilized as side walls also in the carrying configuration.

If the child transport device comprises the carrying arrangement for fastening the child transport device to the carrying person mentioned above, e.g., having wider and/or wadded belts, these belts may be utilized to at least partly form side flaps adapted to protect the child at side impacts.

The main body may comprise a shape retaining element helping the main body to maintain a shape, which is comfortable and safe for the child, e.g., when in the vehicle configuration. Thereby the child transport device may be at least partly self-supportive at least in the region which is to be located in the space between the first and second support elements.

The shape retaining element may be constituted by or comprise a visco-elastic material, such as a phlegmatic foam. This kind of material is formable. However, the degree of formability depends of the speed of the forming movement. For the shape retaining member the formability is preferably chosen such that the material is formable at low speed movements, but stiff at quicker movements. Hence, in situations like if the child transport device is located in a vehicle involved in a collision or if the carrying person falls over and lands on the child transport device, the main body will form a stiff shell-like body, which is capable of at least partly withstanding forces arising in such situations and hence protect the child. Yet the shape retaining member is formable, such that the main body gives a soft feeling, which is comfortable for the child when carrying the child in the carrying configuration or when transporting the child in the vehicle configuration. The formability further depends on the temperature of the material. However, when the child transport device is in contact with the child, its temperature will depend on the surface temperature of the child. Hence the temperature is at least approximately known. This differs from a prior art child seats, which are stored in the vehicle and thus assumes the temperature of the vehicle, which temperature varies a lot between a parked vehicle a sunny summer day and a parked vehicle a cold winter day.

The shape retaining element may comprise three portions corresponding to the first, second and third portions of the main body with hinged connections or connections, which may act like hinges between the portions. Purely as an example, the shape retaining element may comprise a relatively thick material with compressions at the locations corresponding to the connections between the portions.

The main body may comprise a ribbed structure and/or reinforcing straps. The ribbed structure and/or reinforcing straps may constitute, or be comprised in, the shape retaining element. Preferably the ribbed structure or reinforcing straps extend in the longitudinal direction of the main body. Hence, when transforming the child transport device between the carrying configuration and the vehicle configuration, the ribbed structure will be bent in a substantially transverse direction. If reinforcing straps are used, one or more of them may be utilized for tensioning the main body to bride the distance between the first and second support elements, as mentioned above.

The different attachment members, belts or straps as mentioned herein may have adjustable lengths, such that they may be adapted to different mounting positions in the vehicle configuration and the carrying configuration, and also be adapted to different vehicles.

In a second aspect of the present disclosure there is provided a method of attaching a child transport device as described herein to a vehicle. The method is performable while a child is seated in the child transport device, wherein the child is attached to the child transport device by means of the safety harness comprised in the child transport device. The method comprises:
  placing the child transport device in the vehicle with a support from in front by the first support element and from below by the second support element, and
  tensioning the main body, such that it bridges a distance between the first and second support elements.

As mentioned above, the first support element may be a back rest of a vehicle seat, a headrest of a vehicle seat or a dashboard and the second support element may be a cushion of a vehicle seat or a lap of a person sitting in a vehicle seat.

The child transport device is adapted to bridge a distance between the first and second support elements, e.g., the distance between a rear seat and the backrest of a front seat.

In case the child transport device comprises a first and/or a second attachment member as described herein, the method may further comprise:
  attaching the first attachment member to a first attachment point in the vehicle being located in front of the child transport device, e.g., located at a floor of the vehicle or at a dashboard, and/or
  attaching the second attachment member to a second attachment point in the vehicle being located rearward of the child transport device, e.g., located at a seat belt, a seat belt anchor or an ISOFIX anchor,
  utilizing the first attachment member and/or the second attachment member for tensioning the main body, such that it bridges the distance between the first and second support elements, and
  as an optional step, attaching a headrest attachment of the child transport device to a headrest of a vehicle seat in front of the child transport device.

The first attachment member provides a main force retention in a possible rear-end collision of the vehicle or during the rebound phase of a frontal collision. The second attachment member provides a main force retention in a possible frontal collision of the vehicle. The steps including attaching attachment members may be performed in any order.

If the main body comprises a third portion, the method may further comprise:
  displacing the third portion of the main body from a first position at least partly surrounding a belly of the child in the carrying configuration to a second position supporting the legs of the child from below in the vehicle configuration.

This step is suitably performed when transforming the child transport device from the carrying configuration to the vehicle configuration. The step may be performed in the vehicle or outside the vehicle. The child may be present in the child transport device when performing this step.

In case the child transport device comprises at least two side flaps, a first side flap being connected or connectable at least along a portion of the lateral side of the main body and a second side flap being connected or connectable at least along another portion of the lateral side of the main body, the method may further comprise:
  displacing the first side flap to a position supporting a first side of the child seated in the child transport device,
  displacing the second side flap to a position supporting the first side of the child seated in the child transport device,
  attaching the first and second side flaps to each other, e.g., by means of fastening members such as buttons, snap fit members or hook-and-loop members.

In a third aspect of the present disclosure there is provided a vehicle comprising the child transport device.

In a fourth aspect of the present disclosure there is provided a method of transforming a child transport device from a carrying configuration to a vehicle configuration. The method may be performed in the vehicle or outside the vehicle. The child may be present in the child transport device when performing the method.

The method may comprise displacing the third portion of the main body from a first position at least partly surrounding a belly of the child in the carrying configuration to a second position supporting the legs of the child from below in the vehicle configuration.

BRIEF DESCRIPTION OF THE DRAWINGS

The present disclosure will hereinafter be further explained by means of non-limiting examples with reference to the attached drawings.

FIGS. 7A-E schematically illustrate different possible configurations of the child transport device.

It should be noted that the appended drawings are not necessarily drawn to scale and that the dimensions of some features of the present disclosure may have been exaggerated for the sake of clarity.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

The disclosure will, in the following, be exemplified by embodiments. It should however be realized that the embodiments are included in order to explain principles of the disclosure and not to limit the scope of the disclosure, defined by the appended claims. Details from two or more of the embodiments may be combined with each other.

Figure 1:
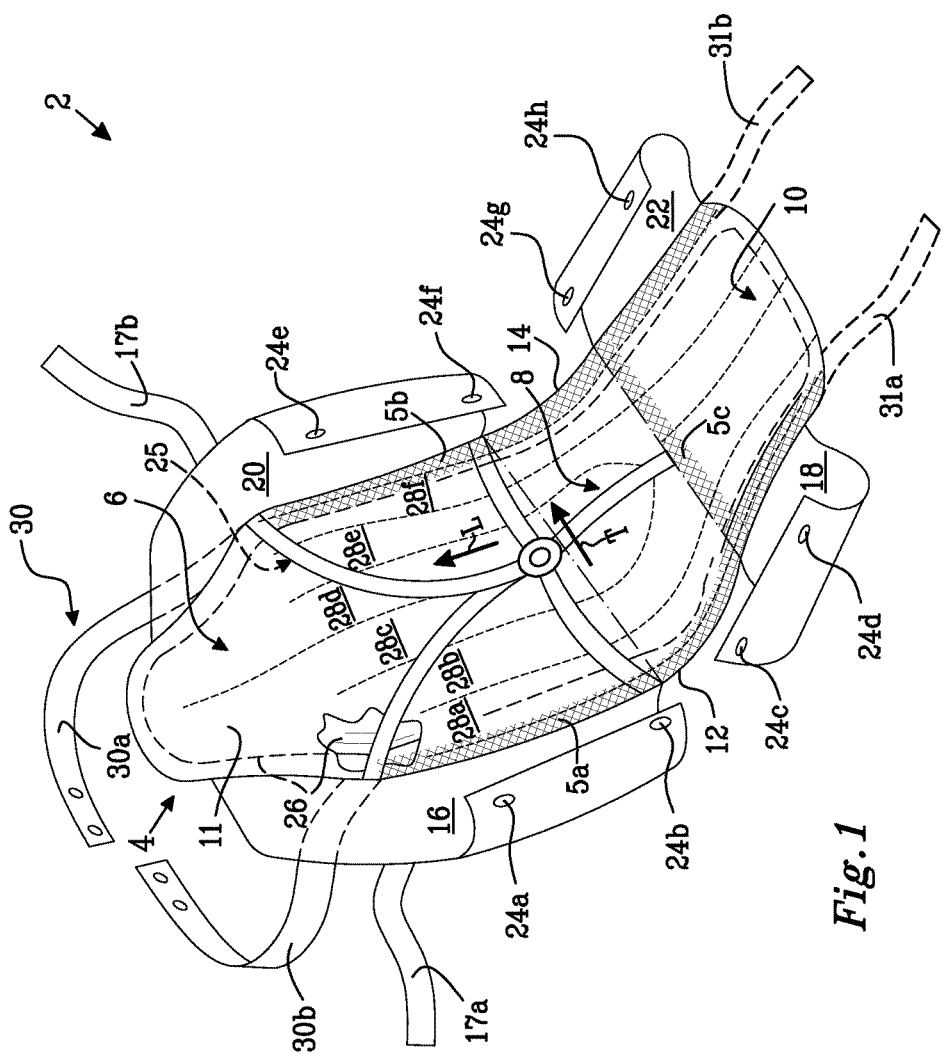
FIG. 1 is a schematic view of a child transport device according to the disclosure.

FIG. 1 schematically illustrates a child transport device 2 for a child according to the disclosure. The child transport device 2 is transformable between a vehicle configuration adapted for attachment in a vehicle, described below in conjunction with FIGS. 2-5 and a carrying configuration, adapted for carrying the child against a body of a person, described below in conjunction with FIG. 6.

The child transport device 2 comprises a main body 4, which in the illustrated embodiment comprises a first portion 6 adapted to receive a back of the child, a second portion 8 adapted to receive a bottom of the child, and a third portion 10 adjacent to the second portion 8 at the opposite side in relation to the first portion 6. The third portion 10 is adapted to support legs of the child from below in the vehicle configuration, see FIGS. 2-5, and to at least partly surround a belly of the child in the carrying configuration, see FIG. 6. The first portion 6 may comprise a part 11 adapted to receive and support a head of the child. The main body 4 has a longitudinal direction L following the surface of the main body 4 in a length direction and a transverse direction T.

The first portion 6 forms a front portion, i.e., a portion of the main body 4 corresponding to a back and/or a neck of the child when located in the child transport device 2.

The second portion 8 and the third portion 10 form a rear portion, e.g., a portion of the main body corresponding to a bottom and/or legs of the child when located in the child transport device 2.

The main body 4 has a first lateral side 12 and a second lateral side 14.

The child transport device 2 may further comprise at least one side flap, connected at least along a portion of the first 12 or second 14 lateral side of the main body 4. The at least one side flap is made of a flexible material such as fabric. The material may be more flexible than that of the main body 4. The side flap may be folded or rolled in relation to the main body 4.

In the illustrated embodiment, there are four side flaps 16, 18, 20, 22. Along the first lateral side 12, a first side flap 16 is connected to the first portion 6 and a second side flap 18 is connected to the third portion 10. Along the second lateral side 14, a third side flap 20 is connected to the first portion 6 and a fourth side flap 22 is connected to the third portion 10. The side flaps 16, 18, 20, 22 comprise fastening members 24a-h, e.g., in the form of buttons, snap fit members or hook-and-loop members. The first side flap 16 can be attached to the second side flap 18 by means of respective fastening members 24b, 24c to form a first side wall in the vehicle configuration, see FIGS. 2-5. Correspondingly, the third side flap 20 can be attached to the fourth side flap 22 by means of respective attachment members 24f, 24g to form a second side wall.

The side flaps 16, 18, 20, 22 are connected to the main body 4, e.g., by being sewn, glued or welded to the main body 4. As an alternative, or a complement, a unitary piece of fabric may form both a part of the main body 4 and one or more of the side flaps 16, 18, 20, 22. As yet an alternative, not illustrated, the side flap may be a separate element, which is connectable to the main body, e.g., by a zipper, buttons or a snap-fit member. One or more straps 17a, 17b may be used to stabilize the position of the side flap 16, 20 in relation to the main body 4 or in relation to another of the side flaps when child transport device 2 is being used.

When in the carrying configuration, one or more of the side flaps 16, 18, 20, 22 can be folded to a back side of the main body 4 and attached to the back side, or pairwise to each other. In the illustrated embodiment the first side flap 16 may be connected to the third side flap 20 by connecting a fastening member of the first side flap 16 to a fastening member of the third side flap 20, i.e., in pairs 24a, 24e; 24b, 24f. Similarly, the second side flap 18 may be connected to the fourth side flap 22 by utilizing the fastening members in pairs 24c, 24g; 24d, 24h. As an alternative, which is further described in conjunction with FIG. 6, the side flaps 16, 18, 20, 22 may be utilized as side walls also in the carrying configuration.

The main body 4 comprises a pair of belts 5a, 5b located at the lateral sides 12, 14 of the main body 4. The belts 5a, 5b are utilized for tensioning the child transport device 2 when mounted in a vehicle.

The main body 4 is adapted to support the child. It may be made of a relatively soft material, which is able to be formed according to the body of the child. Purely as an example, the child transport device 2 may function in a way corresponding to a hammock. The hammock comprises a cloth panel tensioned by ropes, which are to be suspended between two points, e.g., trees. The straps or belts 5a, 5b used for tensioning of the child transport device 2 correspond to the ropes of the hammock. The main body 4 of the child transport device 2 corresponds to the cloth panel of the hammock.

The child transport device 2 comprises a safety harness 25 for attaching the child to the child transport device 2. In the illustrated example the safety harness 25 is a 5-point harness, but also a harness with another number of anchor points would be possible, such as a 3-point harness or a 4-point harness. The 5-point-harness comprises a lap portion, two shoulder belts and a belt between the legs of the child. The safety harness 25 is connected to the belts 5a, 5b utilized for tensioning the main body 4. Thereby forces may be transferred between the belts 5a, 5b and the safety harness 25.

The main body 4 comprises a shape retaining member 26. It may be constituted by or comprise a visco-elastic material, such as a phlegmatic foam. This kind of material is formable. However, the degree of formability depends of the speed of the forming movement. For the shape retaining member the formability is preferably chosen such that the material is formable at low speed movements, but stiff at quicker movements. Hence, in situations like if the child transport device is located in a vehicle involved in a collision or if the carrying person falls over and lands on the child transport device, the main body will form a stiff shell-like body, which is capable of at least partly withstanding forces arising in such situations and hence protect the child. Yet the shape retaining member is formable, such that the main body gives a soft feeling, which is comfortable for the child when carrying it in the carrying configuration or when transporting the child in the vehicle configuration. The formability further depends on the temperature of the material. However, when the child transport device is in contact with the child, its temperature will depend on the surface temperature of the child.

The main body 4 comprises a ribbed structure. Ribs 28a-f may be sewn or welded through the shape retaining member 26. Alternatively, the shape retaining member 26 may comprise a plurality of portions housed in the different channels formed by the ribs 28a-f. The ribs 28a-f extend in the longitudinal direction L of the main body 4. Hence, when transforming the child transport device 2 between the carrying configuration and the vehicle configuration, the ribs 28a-f will be bent substantially in the transverse direction T.

The child transport device 2 further comprises an optional headrest attachment member 30 adapted to attach the child transport device 2 to a headrest of a seat located in front of the child transport device when in the vehicle configuration. In the illustrated embodiment, the headrest attachment member 30 comprises two parts 30a, 30b, which are adapted to encircle the headrest or height adjustment members of the headrest and to be fastened to each other, e.g., by a snap fit member, as is illustrated in FIG. 1, or by another type of fastening members, such as buttons, a buckle, a hook-and-loop member, or by tying the parts together, but it would also be feasible having a headrest attachment member 30 comprising a unitary belt or strap.

The third portion 10 may comprise one or more straps 31a, 31b, which may be used for attachment to the vehicle and/or for shaping the child transport device 2. These straps 31a, 31b may be connected to the belts 5a, 5b or straps for tensioning the main body 4.

In addition to what is illustrated in FIG. 1, the child transport device 2 of the first embodiment comprises attachment members for attaching the child transport device 2 to the vehicle when in the vehicle configuration and to the carrying person when in the carrying configuration. These attachments members are further described in conjunction with FIGS. 2-6.

Figure 2:
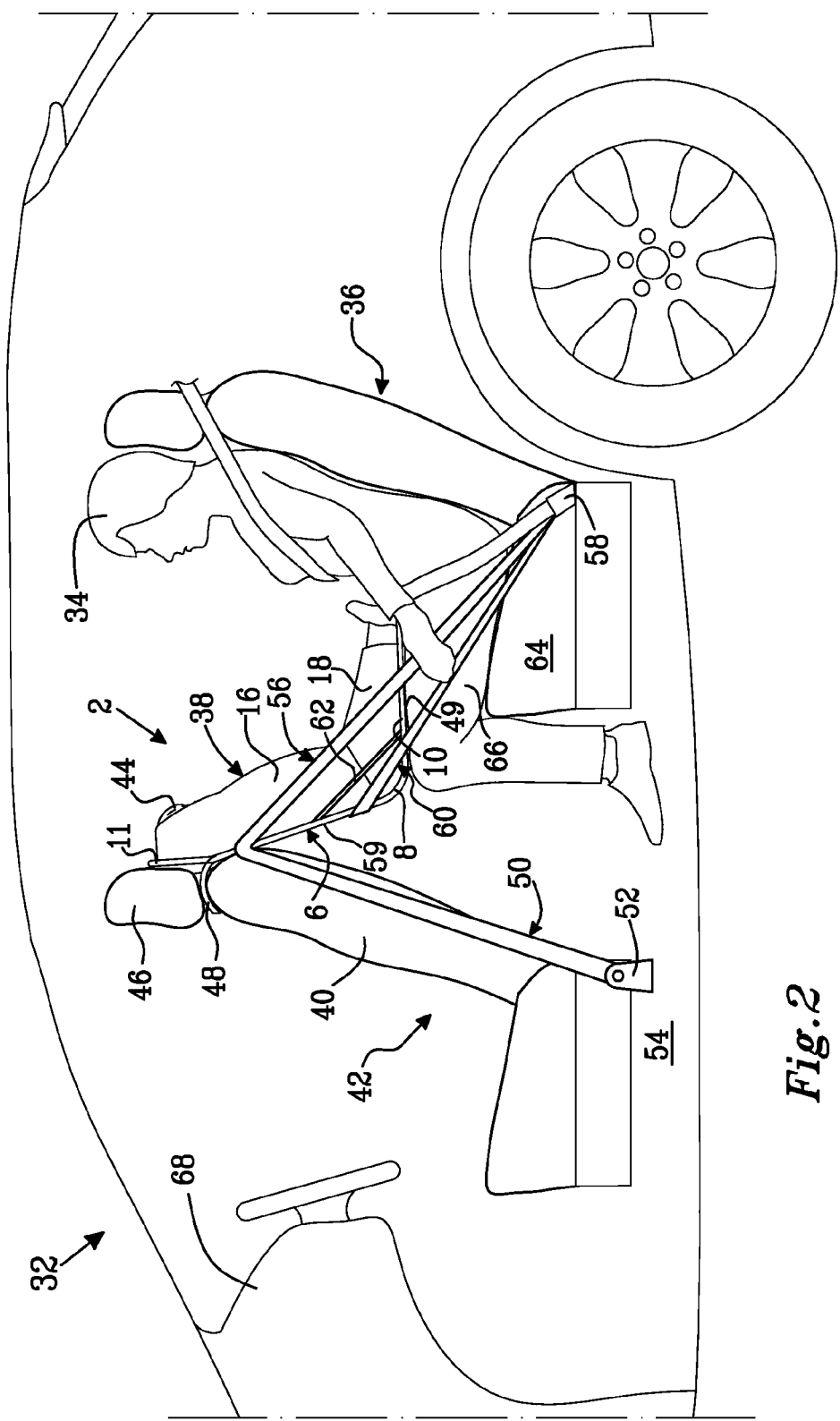
FIG. 2 illustrates the child transport device of FIG. 1 in a vehicle.

FIG. 2 illustrates the child transport device 2 in the vehicle configuration when mounted in a vehicle 32. A person 34, e.g., an adult, is seated in a rear seat 36 of the vehicle 32. A child 38 is seated in the child transport device 2 in a rearward-facing position attached by the safety harness 25, concealed by the first side flap 16 in FIG. 2. The child transport device 2 abuts against a back rest 40 of a front seat 42, such that a part of the first portion 6, i.e., of the front portion, of the child transport device 2 is supported by the back rest 40. In addition the part 11 of the first portion 6 adapted to support a head 44 of the child 38 abuts against a headrest 46 of the front seat 42. The headrest attachment member 30 is attached around height adjustment members 48 comprised in the headrest 46.

A part of the second portion 8 and the third portion 10 of the child transport device 2, which in this embodiment together form the rear portion, abut on a lap 49 of the person 34 in the rear seat 36. The legs of the child 38 are supported by the third portion 10. The person 34 is close to the child 38 and face to face, such that the person 34 and the child 38 can have eye contact. Further, the child 38 is within comfortable reach of the person 34, who can interact with the child 38.

The child transport device 2 comprises side flaps 16, 18, 20, 22 as described above. These form side walls along sides of the child 38 helping to retain the child 38 in place in the child transport device 2, e.g., in case of a side impact.

The child transport device 2 comprises a first attachment member 50, e.g., a pair of straps. The first attachment member 50 is connected, e.g., sewn, glued and/or welded, or connectable, e.g., by means of a hook-and-eye fastener, to the main body 4 for attachment in a forward direction of the vehicle 32. The first attachment member 50 is attached to the vehicle 32 in front of the child transport device 2. The first attachment member 50 may be attached to a dedicated attachment 52 at a floor 54 of the vehicle 32 or it may be attached to a rail of the front seat 42. The first attachment member 50 provides a main force retention in a possible rear-end collision of the vehicle 32 or during the rebound phase of a frontal collision.

The child transport device 2 further comprises a second attachment member 56, e.g., a pair of straps for attachment in a rearward direction of the vehicle 32. The second attachment member 56 is connected to the main body 4 in a similar way as the first attachment member 50. The second attachment member 56 is attached to the vehicle 32 rearward of the child transport device 2. The second attachment member 56 is attached to a second attachment point 58 in the vehicle 32 being located at the vehicle seat 36 rearward of the child transport device 2, e.g., a seat belt of the vehicle seat 36, a seat belt anchor or an ISOFIX anchor. The second attachment member 56 provides a main force retention in a possible frontal collision of the vehicle 32.

The first attachment member 50 and the second attachment member 56 are connected to the first portion 6 of the main body 4 at a height corresponding to a torso of the child 38. Hence there will be a possible force transfer path between the vehicle 32 via the first attachment member 50 and/or the second attachment member 56 and the child transport device 2, e.g., to the belts 5a, 5b or straps for tensioning the main body 4. There is then also a force transfer path between the vehicle 32 and the safety harness 25 of the child.

The pair of straps of the first attachment member 50 may be two separate straps, or one long strap may be attached to a back side 59 of the main body 4, pass along the back side 59 and form both straps of the pair. Similarly, the pair of straps of the second attachment member 56 may be two separate straps, or one long strap may be attached to the back side 59 of the main body 4 and form both straps of the pair. As another alternative, one single long strap may form one strap of the pair of the first attachment member 50 and one strap of the pair of the second attachment member 56. Further, a portion of the first attachment member 50 and/or a portion of the second attachment member 56 may constitute the belt 5a, 5b for tensioning the main body 4.

As an option, the child transport device 2 may comprise an additional second attachment member 60, e.g., a pair of straps, connecting a lower part of the first portion 6 to the vehicle 32 rearward of the child transport device 2, e.g., to the second attachment point 58 as is illustrated.

The child transport device 2 further comprises, as an option, a member 62 providing a connection between the first portion 6 and the second 8 or third portion 10 of the main body 4. The member 62 will help to keep the first portion 6 of the main body 4 relative to the second 8 or third portion 10 in a comfortable position for the child 38.

The different attachment members, belts or straps as mentioned herein may have adjustable lengths, such that they may be adapted to different mounting positions in the vehicle configuration and the carrying configuration and also be adapted to different vehicles.

The one or more straps 31a, 31b, which may be used for attachment to the vehicle and/or for shaping the child transport device 2 see FIG. 1, may be attached to an attachment point in the vehicle 32 being located at the vehicle seat 36 rearward of the child transport device 2, e.g., the seat belt of the vehicle seat 36, the seat belt anchor or the ISOFIX anchor. This attachment point may be the same as for the second attachment member.

Figure 3:
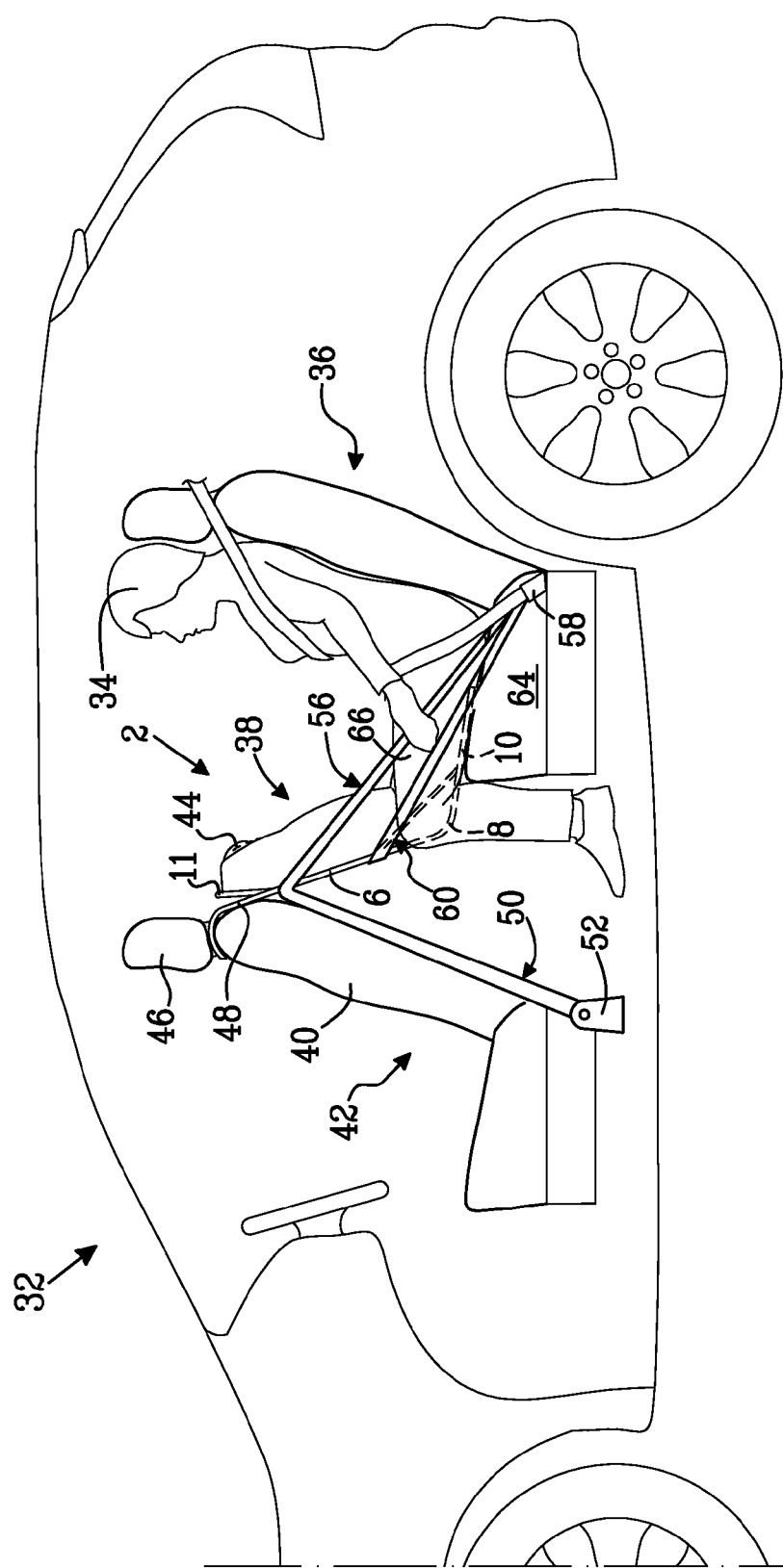
FIG. 3 illustrates an alternative position for the child transport device of FIG. 1 in the vehicle.
Figure 4:
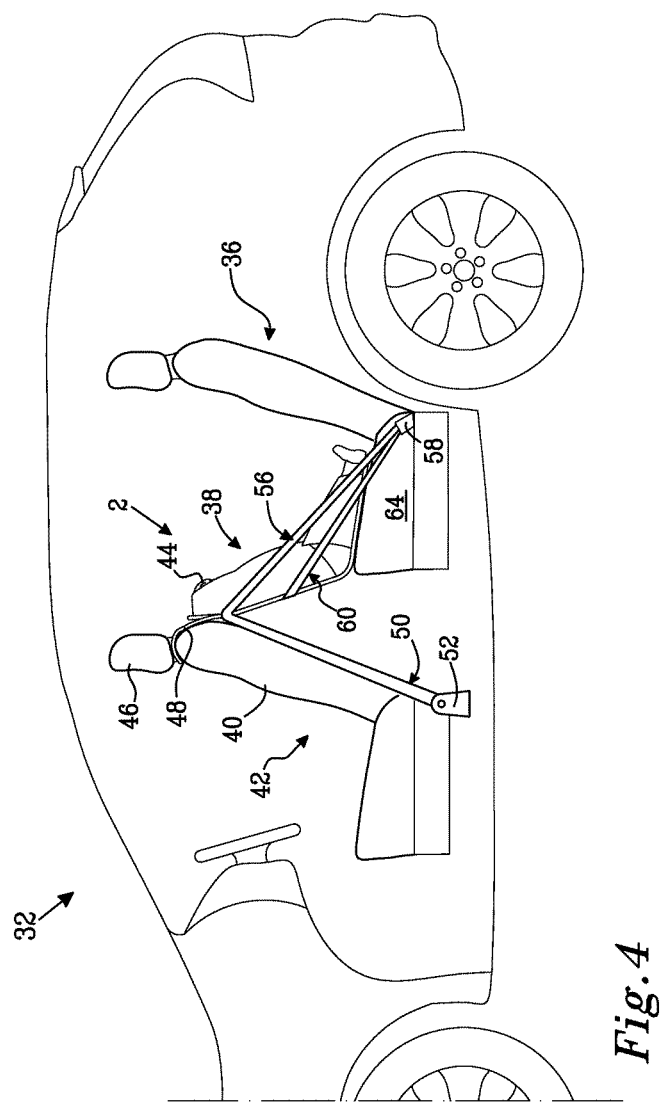
FIG. 4 illustrates another alternative position for the child transport device of FIG. 1 in the vehicle.

FIG. 3 illustrates an alternative position for the child transport device 2 in the vehicle 32 in the vehicle configuration. Similar as for FIG. 2, a person 34 is seated in the rear seat 36. Also in this alternative position the person 34 is close to the child 38 and face to face, such that the person 34 and the child can have eye contact. Further, the child 38 is within comfortable reach of the person 34, who can interact with the child 38.

The child transport device 2, an in particular a part of its second portion 8, abuts on a cushion 64 of the rear seat 36 between the legs 66 of the person 34. The child transport device 2 abuts against the back rest 40 of the front seat 42, such that the first portion 6 of the child transport device 2 is supported by the back rest 40 at the part 11 of the first portion 6 adapted to support the head 44 of the child 38. The attachment members 50, 56, 60 are attached in a way corresponding to as described for FIG. 2.

The child transport device 2 may also be utilized without any person 34 in the rear seat 36 or with a person in another of the seats in the rearward of the vehicle 32. See FIG. 4. The child transport device 2 would in that case abut on the cushion 64 of the rear seat 36 assuming the alternative position described in conjunction with FIG. 3.

Figure 5:
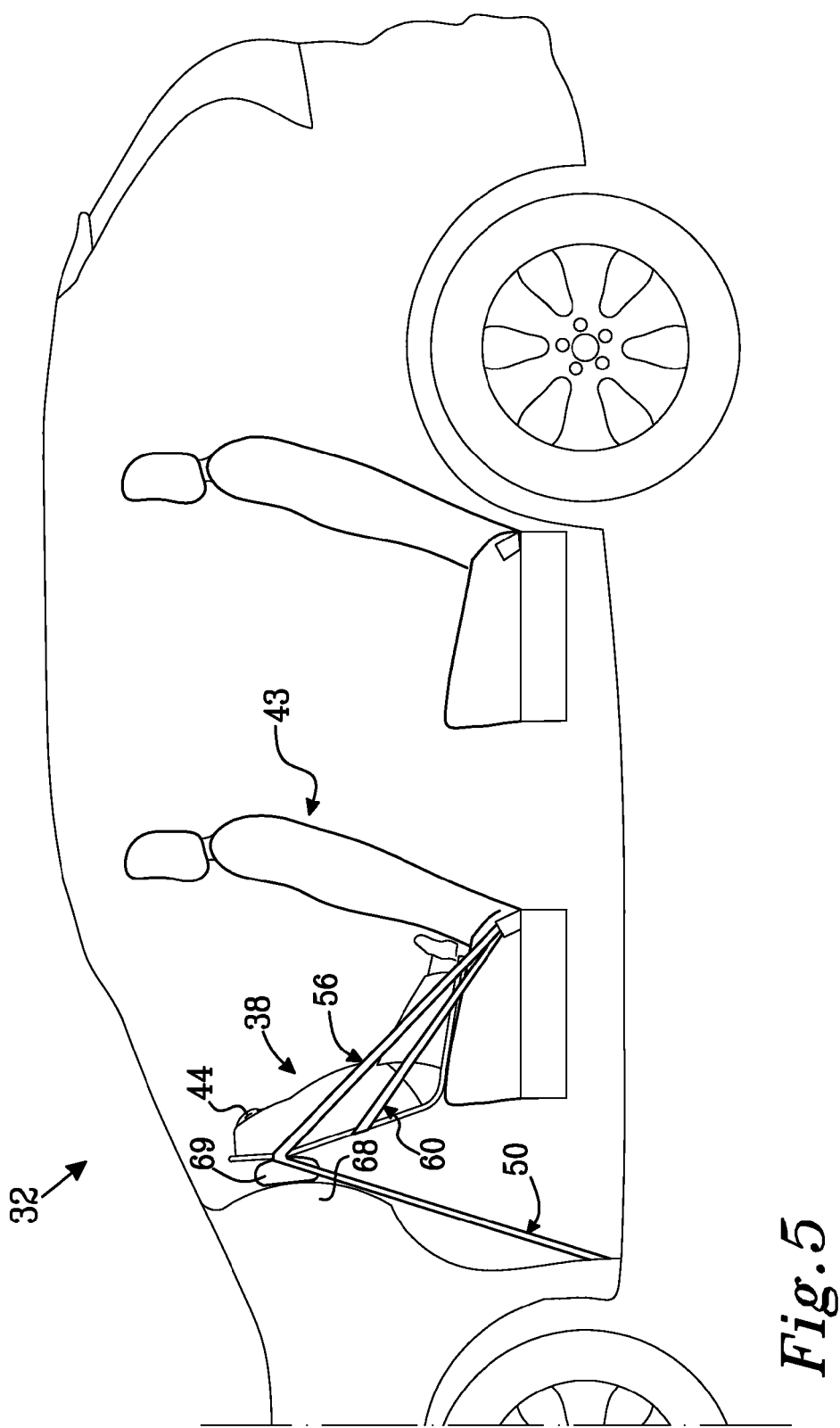
FIG. 5 illustrates yet another alternative position for the child transport device of FIG. 1 in the vehicle.

It is also possible to use the child transport device 2 at a passenger front seat 43 of the vehicle 32. See FIG. 5. The child transport device 2 would in that case abut against a dashboard 68 of the vehicle 32, e.g., by means of a dashboard connection 69. The child transport device 2 may then abut in the lap of a person in the passenger front seat 43 in a similar way as described for the position of FIG. 2, or abut against the seat in a similar way as described for the position of FIGS. 3 and 4, and as illustrated in FIG. 5. The first attachment means 50 is attached to the vehicle 32, e.g., to the floor, in front of the child transport device 2. The second attachment member 56 is attached to a second attachment point in the vehicle 32 being located at the seat 43 rearward of the child transport device 2, e.g., a seat belt of the front seat 43, a seat belt anchor or an ISOFIX anchor.

If a child seat for a larger child, e.g., 1-4 years old, is already available in the vehicle 32, not illustrated, the child transport device 2 may be placed in that child seat as an insert.

Figure 6:
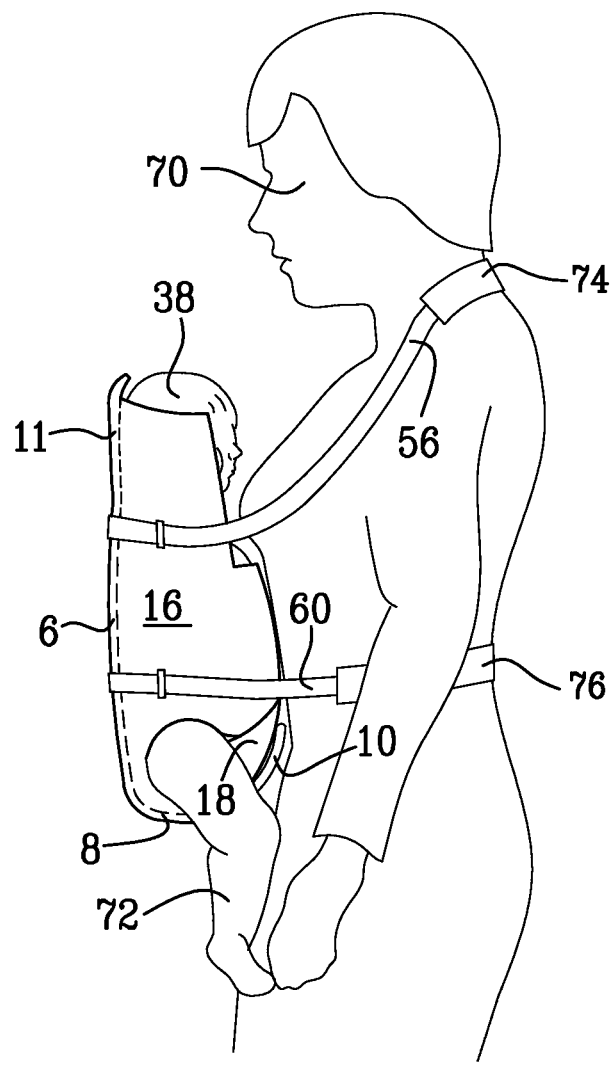
FIG. 6 illustrates the child transport device of FIG. 1 when being carried.

FIG. 6 illustrates the child transport device 2 in the carrying configuration. The child 38 is carried against a torso of the carrying person 70 such that they are in body-to body contact. The first portion 6 of the main body 4 supports the back of the child 38. The second portion 8 supports the bottom of the child 38. The third portion 10 at least partly surrounds the belly of the child 38. The first side flap 16 and the second side flap 18 form a side wall at one side of the child 38 and the third side flap 20 and the fourth side flap 22 form a side wall at the other side of the child 38. The legs 72 of the child 38 protrude between the side flaps 16, 18, 20, 22.

The first attachment member 50 or the second attachment member 56 may be utilized to fasten the child transport device 2 to the carrying person 70, e.g., at chest height and/or around the nape of the neck. The additional second attachment member 60, if any, may be utilized to fasten the child transport device 2 to the carrying person 70, e.g., at waist height. Elongate pads 74, 76 may be used to distribute the pressure on the carrying person 70. It would also be possible, not illustrated, to use a carrying arrangement for fastening the child transport device 2, to the carrying person, e.g., having wider and/or wadded belts, such as a waist-belt or shoulder belts corresponding to the belts used in a backpack or rucksack.

As an alternative for the carrying configuration, illustrated below in conjunction with FIG. 7E, the second 8 and third portions 10 may be folded to the back of the first portion 6, or the third portion 10 may be folded to the back of the second portion 8. The child may then be supported from below by a piece of cloth, e.g., connected to a waist belt of the carrying person 70. Further, a waist belt of the carrying person 70 may also be utilized to provide a side protection for the child, reducing or avoiding the risk of the child falling out sideways from the child transport device 2.

FIGS. 7A-E schematically illustrate different possible configurations of the child transport device 2.

FIG. 7A illustrates the vehicle configuration, which is also illustrated in FIGS. 2-5. The first portion 6 and the second portion 8 assume an angle $\alpha_1$ in relation to each other being in the range of $90°<\alpha_1<145°$, preferably $100°<\alpha_1<135°$, more preferably $110°<\alpha_1<125°$. The second portion 8 and the third portion 10 assume an angle $\beta_1$ in relation to each other being in the range of $160°<\beta_1<200°$, preferably substantially $180°$.

FIG. 7B illustrates the carrying configuration, which is also illustrated in FIG. 6. The first portion 6 and the second portion 8 assume an angle $\alpha_2$ in relation to each other being in the range of $70°<\alpha_2<110°$, preferably $80°<\alpha_2<100°$, more preferably $85°<\alpha_2<95°$. The second portion 8 and the third portion 10 assume an angle $\beta_2$ in relation to each other being in the range of $70°<\beta_2<110°$, preferably $80°<\beta_2<100°$, more preferably $85°<\beta_2<95°$.

FIG. 7C illustrates a third configuration, which is suitable when placing the child 38 in the child transport device 2. The child transport device 2 lies flat, e.g., on a table or on a floor. The child is placed with its back against the first portion 6 and its bottom against the second portion 8. Thereafter the third portion 10 may be folded, such that the child transport device 2 assumes the carrying configuration. In the third configuration, the first portion 6 and the second portion 8 assume an angle $\alpha_3$ in relation to each other being in the range of $160°<\alpha_3<200°$, preferably substantially $180°$. The second portion 8 and the third portion 10 assume an angle $\beta_3$ in relation to each other being in the range of $160°<\beta_3<200°$, preferably substantially $180°$.

FIG. 7D illustrates a fourth configuration, which is suitable for storing the child transport device 2. The first portion 6 and the second portion 8 assume an angle $\alpha_4$ in relation to each other being substantially $0°$. The second portion 8 and the third portion 10 assume an angle $\beta_4$ in relation to each other being in the range of $160°<\beta_4<200°$, preferably substantially $180°$.

FIG. 7E illustrates a fifth configuration, which is an alternative for the carrying configuration of FIG. 7B. The second 8 and third portions 10 are folded to the back of the first portion 6. The first portion 6 and the second portion 8 assume an angle $\alpha_5$ in relation to each other being substantially $0°$. The second portion 8 and the third portion 10 assume an angle $\beta_5$ in relation to each other being in the range of 160°<$\beta_5$<200°, preferably substantially 180°. The child may then be supported from below by a piece of cloth 78.

Figure 8:
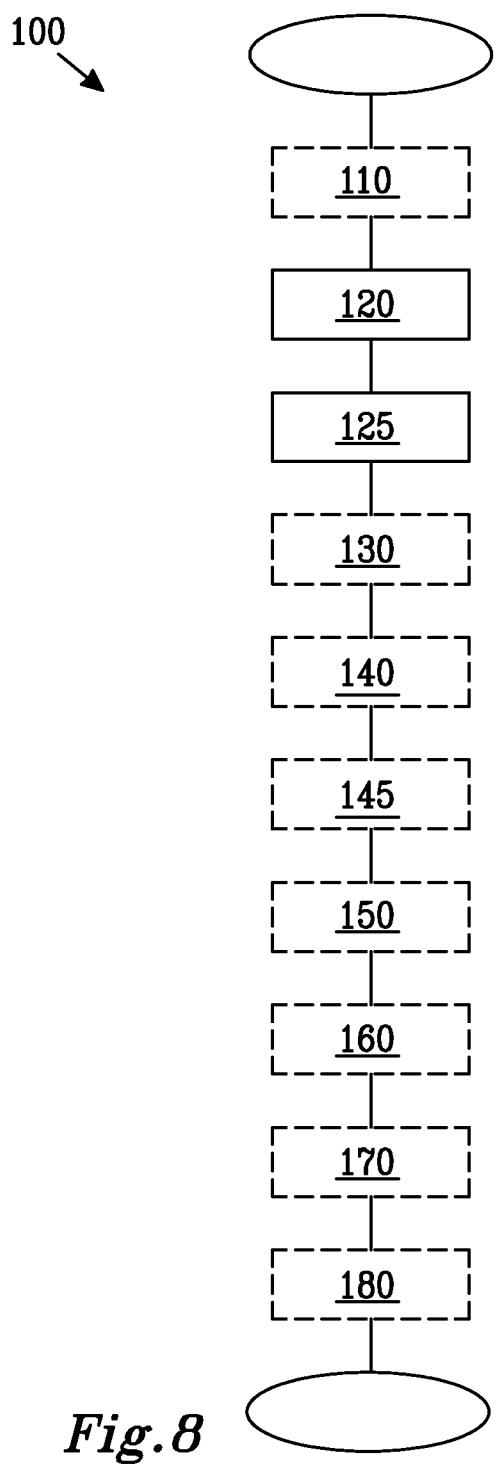
FIG. 8 illustrates a method of attaching a child transport device to a vehicle.

FIG. 8 illustrates a method 100 vehicle according to the disclosure for attaching a child transport device 2 as described herein to a vehicle 32. The child is supposed to be attached by the safety harness 25 to the child transport device 2. Optional steps are marked by dashed boxes.

The method comprises:

120: Placing the child transport device 2 in the vehicle 32 with a support from in front by a first support element and from below by the second support element.

125: Tensioning the main body 4, such that it bridges a distance between the first and second support elements.

The first support element may be a back rest 40 of a vehicle seat, a headrest 46 of a vehicle seat or a dashboard 68. The second support element may be a cushion 64 of a vehicle seat 36, 43 or a lap 49 of a person 34 sitting in a vehicle seat 36, 43.

The child transport device 2 is adapted to bridge a distance between the first and second support elements, e.g., the distance between the backrest of a front seat and a rear seat.

In case the child transport device comprises a first 50 and/or second attachment 56, 60 member, the method further may comprise:

130: Attaching the first attachment member 50 to a first attachment point 52 in the vehicle 32 being located in front of the child transport device 2, e.g., located at a floor 54 of the vehicle 32 or at a dashboard 68, and/or 140: Attaching the second attachment member 56, 60 to a second attachment point 58 in the vehicle 32 located rearward of the child transport device 2, e.g., located at a seat belt, a seat belt anchor or an ISOFIX anchor.

145: Utilizing the first attachment member 50 and/or the second attachment member 56, 60 for tensioning the main body 4, such that it bridges the distance between the first and second support elements.

150: As an optional step, attaching a headrest attachment 30 of the child transport device 2 to a headrest 46, 48 of a vehicle seat 40 in front of the child transport device 2.

The first attachment member 50 provides a main force retention in a possible rear-end collision of the vehicle 32 or during the rebound phase of a frontal collision. The second attachment member 56 provides a main force retention in a possible frontal collision of the vehicle 32.

Step 125 above is in this embodiment of the method performed as step 145.

Steps 130, 140 and 150 may be performed in any order.

If the child transport device 2 comprises a third portion 10, the method may further comprise:

110: Displacing the third portion 10 of the main body 4 from a first position at least partly surrounding a belly of the child 38 in the carrying configuration to a second position supporting the legs 72 of the child 38 from below in the vehicle configuration.

Step 110 is suitably performed when transforming the child transport device 2 from the carrying configuration to the vehicle configuration. Step 110 may be performed in the vehicle or outside the vehicle. The child 38 may be present in the child transport device 2, when performing this step 110.

In case the child transport device 2 comprises at least two side flaps 16, 18, 20, 22, a first side flap 16, 18; 20, 22 connected or connectable at least along a portion of the lateral side 12, 14 of the main body 4 and a second side flap 18, 16; 22, 20 connected or connectable at least along another portion of the lateral side 12, 14 of the main body 4, the method may further comprise:

160: Displacing the first side flap 16, 18; 20, 22 to a position supporting a first side of the child 38 seated in the child transport device 2.

170: Displacing the second side flap 18, 16; 22, 20 to a position supporting the first side of the child 38 seated in the child transport device 2.

180: Attaching the first and second side flaps 16, 18; 20, 22 to each other, e.g., by means of a snap fastener 24b, 24c: 24f, 24g.

Further modifications of the disclosure within the scope of the appended claims are feasible. As such, the present disclosure should not be considered as limited by the embodiments and figures described herein. Rather, the full scope of the disclosure should be determined by the appended claims, with reference to the description and drawings.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A child transport device for a child, the child transport device comprising:
    a main body having a first portion configured to receive a back of the child, a second portion configured to receive a bottom of the child, and a third portion adjacent the second portion at an opposite side in relation to the first portion, wherein the first portion corresponds to a front portion of the main body, and the second portion and/or the third portion correspond to a rear portion of the main body; connectors on lateral sides of the third portion for connecting the third portion to the first portion;
    a safety harness adapted to secure the child to the main body; and first and second attachment members configured to attach the main body to the vehicle;
    wherein the child transport device is transformable between a vehicle configuration adapted for attachment in a vehicle so that the child transport device is usable as a rearward-facing child seat, and a carrying configuration adapted for carrying the child with body-to-body contact against a body of a person, wherein, in the vehicle configuration, the front portion of the main body is adapted to be supported by a first support element, and the rear portion of the main body is adapted to be supported by a second support element, wherein the third portion of the main body is displaceable from a first position, in which the connectors on the lateral sides of the third portion connect the third portion to the first portion, or at least partly surrounding a belly of the child in the carrying configuration to a second position for supporting legs of the child from below in the vehicle configuration, and wherein the first attachment member or the second attachment member is utilizable to tension the main body, such that the main body, when tensioned, is configured to bridge a distance between the first and second support elements.

2. A child transport device for a child, the child transport device comprising:

a main body having a first portion configured to receive a back of the child, a second portion configured to receive a bottom of the child, and a third portion adjacent the second portion at an opposite side in relation to the first portion, wherein the first portion corresponds to a front portion of the main body, and the second portion and/or the third portion correspond to a rear portion of the main body; connectors on lateral sides of the third portion for connecting the third portion to the first portion and a safety harness adapted to secure the child to the main body;

wherein the child transport device is transformable between a vehicle configuration adapted for attachment in a vehicle so that the child transport device is usable as a rearward-facing child seat, and a carrying configuration adapted for carrying the child with body-to-body contact against a body of a person, wherein, in the vehicle configuration, the front portion of the main body is adapted to be supported by a first support element, and the rear portion of the main body is adapted to be supported by a second support element, wherein the third portion of the main body is displaceable from a first position, in which the connectors on the lateral sides of the third portion connect the third portion to the first portion for at least partly surrounding a belly of the child in the carrying configuration to a second position for supporting legs of the child from below in the vehicle configuration, and wherein the child transport device further includes:

a first attachment member connected or connectable to the main body for attachment in a forward direction of the vehicle; and/or a second attachment member connected or connectable to the main body for attachment in a rearward direction of the vehicle;

the first attachment member and or the second attachment member being utilizable to tension the main body such that the main body, when tensioned, is configured to bridge a distance between the first and second support elements.

3. The child transport device according to claim 2 wherein the first support element comprises a back rest of a vehicle seat, a headrest of a vehicle seat or a dashboard.

4. The child transport device according to claim 2 wherein the second support element comprises a cushion of a vehicle seat or a lap of a person sitting in a vehicle seat.

5. The child transport device according to claim 2 further comprising belts or straps configured to tension the main body.

6. The child transport device according to claim 2 wherein the first attachment member and/or the second attachment member comprise/comprises a belt or a strap, or a pair of belts or straps.

7. The child transport device according to claim 2 further comprising a headrest attachment member adapted to attach the child transport device to a headrest of a vehicle seat located in front of the child transport device.

8. The child transport device according to claim 2 wherein the first and second portions of the main body assume an angle $\alpha$ in relation to each other, in the vehicle configuration the angle $\alpha$ being in the range of $90°<\alpha<145°$.

9. The child transport device according to claim 2 wherein the main body comprises first and second lateral sides, and the child transport device further comprises at least one side flap connected or connectable at least along a portion of the first or second lateral side of the main body.

10. The child transport device according to claim 2 further comprising a first side flap connected or connectable at least along a portion of the lateral side of the main body, and a second side flap connected or connectable at least along another portion of the lateral side, the first side flap and the second side flap being attachable to each other distant from the connections to the main body.

11. The child transport device according to claim 2 wherein the main body comprises a ribbed structure and/or reinforcing straps.

12. The child transport device according to claim 11 wherein the ribbed structure or reinforcing straps extend in a longitudinal direction of the main body.

13. The child transport device according to claim 2 wherein the main body further comprises a shape retaining element that comprises a visco-elastic material.

14. The child transport device according to claim 13 wherein the visco-elastic material comprises foam.

15. A method of attaching a child transport device according to claim 2 to a vehicle, the method being performable while a child is seated in the child transport device, the child being secured by the safety harness comprised in the child transport device, the method comprising:

placing the child transport device in the vehicle with a support from in front by the first support element and from below by the second support element; and tensioning the main body such that the main body bridges a distance between the first and second support elements.

16. The method according to claim 15 wherein the child transport device comprises a first attachment member and/or a second attachment member, and wherein the method further comprises:

attaching the first attachment member to a first attachment point in the vehicle located in front of the child transport device, and/or attaching the second attachment member to a second attachment point in the vehicle located rearward of the child transport device; and utilizing the first attachment member and/or the second attachment member for tensioning the main body, such that the main body bridges the distance between the first and second support elements.

17. The method according to claim 15 wherein the first attachment point is located at a floor or at a dashboard of the vehicle, and the second attachment point is located at a seat belt, a seat belt anchor or an ISOFIX anchor.

18. The method according to claim 15 further comprising attaching a headrest attachment of the child transport device to a headrest of a vehicle seat in front of the child transport device.

19. The method according to claim 15 wherein the child transport device comprises a first side flap connected or connectable at least along a portion of a lateral side of the main body and a second side flap connected or connectable at least along another portion of the lateral side of the main body, and wherein the method further comprises:

displacing the first side flap to a position supporting a first side of the child seated in the child transport device;

displacing the second side flap to a position supporting the first side of the child seated in the child transport device; and attaching the first and second side flaps to each other.

20. The child transport device according to claim 2 wherein, in the vehicle configuration, the second portion and the third portion assume an angle $\beta_1$ in relation to each other in the range of $160°<\beta_1<200°$.

21. The child transport device according to claim 20 wherein, in the carrying configuration, the second portion and the third portion assume an angle $\beta_2$ in relation to each other in the range of $70°<\beta_2<110°$.

\* \* \* \* \*

UNITED STATES PATENT AND TRADEMARK OFFICE
CERTIFICATE OF CORRECTION

PATENT NO. : 9,730,526 B2  
APPLICATION NO. : 14/714689  
DATED : August 15, 2017  
INVENTOR(S) : Mattias Erik Brannstrom et al.

Page 1 of 1

It is certified that error appears in the above-identified patent and that said Letters Patent is hereby corrected as shown below:

In the Claims

Column 16, Line 39, Claim 1:  
Before "connectors on lateral sides . . . third portion to the first portion"  
Begin a new paragraph.

Column 16, Line 43, Claim 1:  
After "and"  
Begin a new paragraph.

Column 16, Line 58, Claim 1:  
After "to the first portion,"  
Delete "or" and  
Insert -- for --.

Column 17, Line 8, Claim 2:  
Before "connectors on lateral"  
Begin a new paragraph.

Column 17, Line 10, Claim 2:  
Before "and"  
Insert -- ; --.

Column 17, Line 26, Claim 2:  
After "to the first portion,"  
Insert -- , --.

Column 17, Line 37, Claim 2:  
After "first attachment member and,"  
Insert -- / --.

Signed and Sealed this  
Fifth Day of May, 2020

Andrei Iancu  
*Director of the United States Patent and Trademark Office*